United States Patent
Schwartz

(10) Patent No.: US 10,035,585 B2
(45) Date of Patent: Jul. 31, 2018

(54) ROTARY ACTUATOR FOR CONTROLLING A FLIGHT CONTROL SURFACE

(71) Applicant: GOODRICH ACTUATION SYSTEMS SAS, Buc (FR)

(72) Inventor: Laurent Schwartz, Orsay (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 243 days.

(21) Appl. No.: 14/933,016

(22) Filed: Nov. 5, 2015

(65) Prior Publication Data
US 2016/0129990 A1 May 12, 2016

(30) Foreign Application Priority Data
Nov. 6, 2014 (EP) .................................. 14306776

(51) Int. Cl.
*B64C 13/28* (2006.01)
*F16H 35/10* (2006.01)
*F16H 35/00* (2006.01)

(52) U.S. Cl.
CPC .............. *B64C 13/28* (2013.01); *F16H 35/10* (2013.01); *F16H 2035/005* (2013.01)

(58) Field of Classification Search
CPC ........... B64C 9/32; B64C 9/323; B64C 9/326; B64C 13/28; F16D 7/08; F16D 43/206; F16D 7/06; F16D 41/04; F16D 43/204
See application file for complete search history.

(56) References Cited

U.S. PATENT DOCUMENTS

| | | | | |
|---|---|---|---|---|
| 4,030,578 A * | 6/1977 | Cacciola | ................. | B64C 13/28 188/134 |
| 4,176,733 A * | 12/1979 | Twickler | ................. | B64C 13/28 188/134 |
| 4,579,201 A * | 4/1986 | Tiedeman | ............... | B64C 13/28 188/134 |
| 5,199,538 A * | 4/1993 | Fischer | .................... | B64C 9/16 188/134 |
| 5,582,390 A * | 12/1996 | Russ | ...................... | B64C 13/28 244/99.2 |
| 5,918,836 A | 7/1999 | Russ | | |
| 7,690,597 B2 * | 4/2010 | Cavalier | ................. | B64C 13/28 244/213 |

(Continued)

FOREIGN PATENT DOCUMENTS

DE 4413854 A1 10/1995
EP 1239185 A1 9/2002
(Continued)

OTHER PUBLICATIONS

European Search Report for application No. EP14306776.7; dated Apr. 21, 2015, 6 pages.

Primary Examiner — Joseph W Sanderson
(74) Attorney, Agent, or Firm — Cantor Colburn LLP

(57) ABSTRACT

A rotary actuator for controlling a flight control surface and a flight control surface actuation assembly including the rotary actuator. The actuator comprises a rotary output shaft for driving a flight control surface, a locking mechanism for selectively preventing rotation of the rotary output shaft and a torque limiter for allowing the locking mechanism to be bypassed upon the locking mechanism experiencing a torque above a predetermined limit.

10 Claims, 3 Drawing Sheets

(56) References Cited

U.S. PATENT DOCUMENTS

| | | | |
|---|---|---|---|
| 8,668,065 B2* | 3/2014 | Kampf | F16D 7/08 |
| | | | 192/12 B |
| 9,470,272 B2* | 10/2016 | Gitnes | F16D 7/00 |
| 2002/0030138 A1* | 3/2002 | Serven | B64C 13/28 |
| | | | 244/99.2 |
| 2006/0163026 A1 | 7/2006 | Lang | |
| 2009/0078524 A1* | 3/2009 | Christensen | F16D 7/08 |
| | | | 192/55.1 |
| 2010/0213311 A1 | 8/2010 | Flatt | |
| 2011/0021307 A1 | 1/2011 | Davies | |
| 2011/0036679 A1* | 2/2011 | Kampf | F16D 7/08 |
| | | | 192/17 C |
| 2014/0135132 A1 | 5/2014 | Kohuth | |
| 2015/0018155 A1* | 1/2015 | Gitnes | F16D 7/00 |
| | | | 475/263 |

FOREIGN PATENT DOCUMENTS

| | | |
|---|---|---|
| GB | 1309645 A | 3/1973 |
| WO | 9842567 A1 | 10/1998 |

\* cited by examiner

ROTARY ACTUATOR FOR CONTROLLING A FLIGHT CONTROL SURFACE

FOREIGN PRIORITY

This application claims priority to European Patent Application No. 14306776.7 filed Nov. 6, 2014, the entire contents of which is incorporated herein by reference.

TECHNICAL FIELD

The present disclosure relates to a rotary actuator for controlling a flight control surface and a flight control surface actuation assembly comprising a rotary actuator.

BACKGROUND OF THE INVENTION

It is well known to use a rotary actuator to control the position of a flight control surface, such as a spoiler on an aircraft wing. It is also known to use a "no-back" device to prevent the flight control surface from back-driving the actuator.

SUMMARY

There is disclosed herein a rotary actuator assembly for controlling a flight control surface, the actuator comprising a rotary output shaft for driving a flight control surface, a locking mechanism for selectively preventing rotation of the rotary output shaft and a torque limiter for allowing the locking mechanism to be bypassed upon the locking mechanism experiencing a torque above a predetermined limit.

The use of the term 'bypassed' should be understood to mean that the torque limiter can allow the output shaft to operate normally (i.e. rotate freely) even though the locking mechanism is in a locked state (which without the bypass function of the torque limiter would cause the shaft to be prevented from rotating freely). If the torque experienced by the locking mechanism is at or below the predetermined level, the torque limiter will not bypass the locking function of the locking mechanism.

The locking mechanism may prevent a flight control surface being moved by an external force such as high or low aerodynamic pressure acting on the surface. The locking mechanism may prevent the flight control surface being unintentionally extended.

The torque limiter may allow the surface to be moved by such an external force if the force is so large that damage to the surface, or another part of the wing or the actuator (such as the locking mechanism) may occur should the surface be held in place by the locking mechanism. The torque limiter may therefore allow the surface to be extended by the external force.

The rotary actuator may be a servo-controlled rotary actuator.

The locking mechanism may be configured, when in the first operating state to allow rotation of the output shaft in both first and second rotational directions, and, when in the second operating state to prevent rotation of the output shaft in the first rotational direction and to allow rotation of the output shaft in the second rotational direction.

The first rotational direction may be that direction in which the output shaft moves to actuate a flight control surface, i.e. to extend the flight control surface into a deployed position. As such, the second rotational direction may be the direction in which the output shaft moves to retract the surface to a stowed position.

The locking mechanism may comprise a locking actuator for switching the locking mechanism between first and second operating states.

The locking mechanism may be configured such that in the first operating state the locking actuator is activated and, upon deactivation of the second actuator, the locking mechanism is be switched from the first operating state to the second operating state.

The locking mechanism may further comprise a ratchet wheel operatively connected to the output shaft and rotatable therewith and a pawl operatively connected to the locking actuator and being operable between a first position in its first operating state to a second position in the second state. The pawl may be out of contact with the ratchet wheel in its first position to allow rotation of the output shaft in the first rotational direction. The pawl may be in contact with the ratchet wheel in its second position to prohibit rotation of the output shaft in the first rotational direction.

The locking mechanism may further comprise a pawl biasing member arranged to bias the pawl into its second position. The pawl biasing member may be a pawl spring.

The locking actuator may be configured to switch the locking mechanism into its first operating state by overcoming the bias force of the pawl biasing member and moving the pawl into its first position.

In its second operating state, the locking actuator may be deactivated to allow the pawl biasing member to bias the pawl into its second position.

The torque limiter may be arranged or configured such that, upon the locking mechanism being in its second operating state and experiencing a torque above the predetermined limit, the torque limiter may allow the output shaft to rotate relative to the ratchet wheel (even though the pawl is in contact with the ratchet wheel).

The torque limiter may comprise a ball detent torque limiter.

The ball detent torque limiter may comprise a plurality of balls located in recesses in the ratchet wheel and a ball biasing member associated with each ball.

Each ball biasing member may comprise a spring.

The locking actuator may be a linear actuator (i.e. having a linear output) and may comprise a solenoid and a push rod.

The present disclosure also extends to a flight control surface actuation assembly comprising a rotary actuator as described above and a flight control surface being operatively connected to the rotary output shaft.

Rotating the rotary output shaft in the first direction may cause the flight control surface to be extended into a deployed position. Rotating the rotary output shaft in the second direction may cause the flight control surface to be moved into a stowed position.

The flight control surface may be a spoiler.

The present disclosure also extends to an aircraft comprising a flight control surface actuation assembly as described above.

BRIEF DESCRIPTION OF THE DRAWINGS

An exemplary embodiment of the present disclosure will now be described by way of example only and with reference to FIGS. 1 to 4, of which.

DETAILED DESCRIPTION OF THE INVENTION

Figure 2:
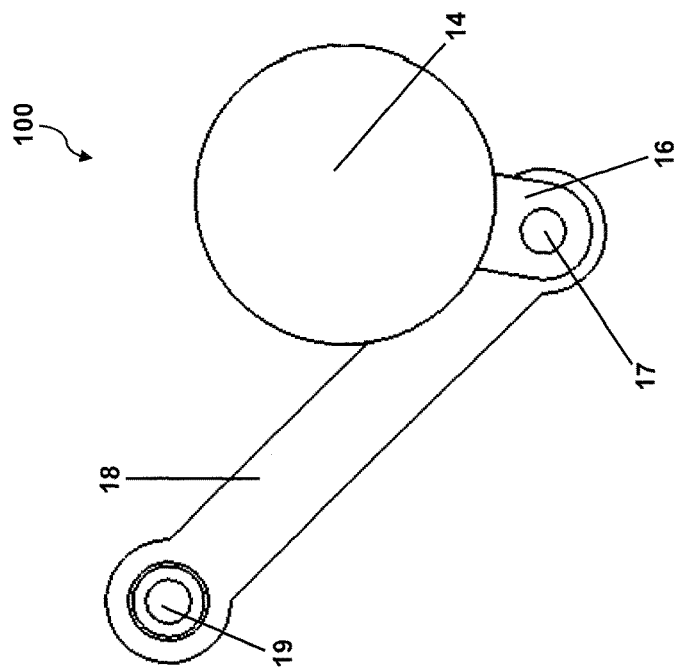
FIG. 2 is an end view of the exemplary rotary actuator of FIG. 1.
Figure 1:
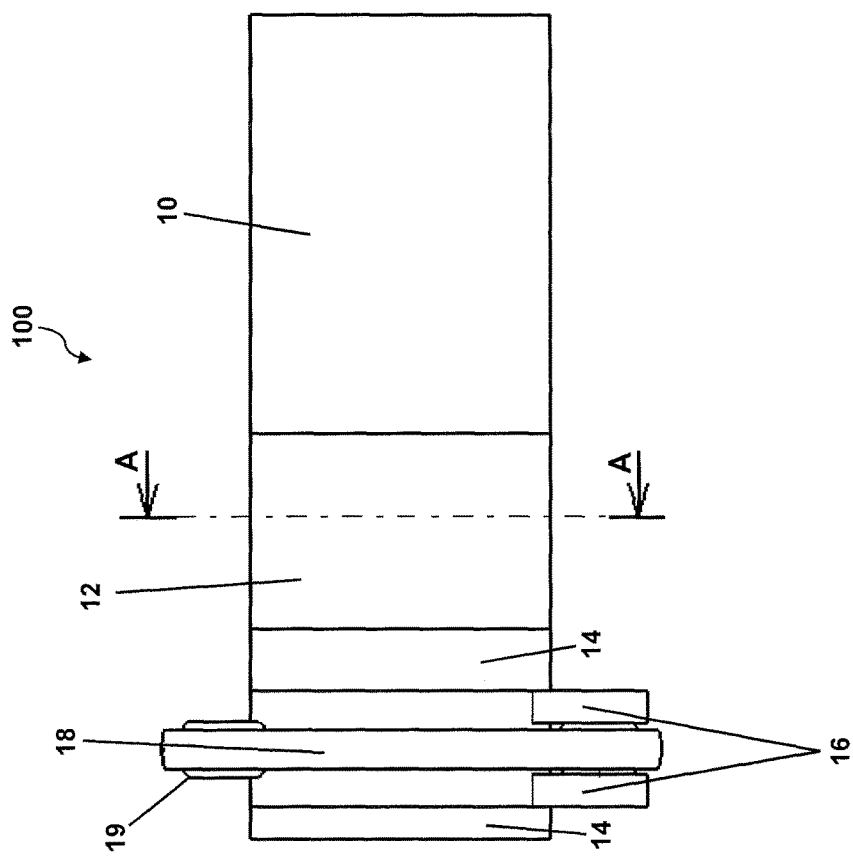
FIG. 1 is an overview of an exemplary rotary actuator in accordance with an embodiment of the present disclosure.

FIG. 1 shows a schematic overview of a rotary actuator 100 for controlling a flight control surface (not shown). The actuator 100 comprises, in serial operative connection, a motor module 10, an anti-extension module 12, a gearbox 14 and an output lever 16. The output lever 16 is connected to a connecting rod 18, via a pivot point 17 (FIG. 2). The connecting rod 18 has a connection point 19 at its free end that can be connected to a flight control surface (not shown), as is known in the art.

FIG. 2 shows an end view of the actuator 100 of FIG. 1. The pivot point 17 between output lever 16 and connecting rod 18 is shown.

Figure 3:
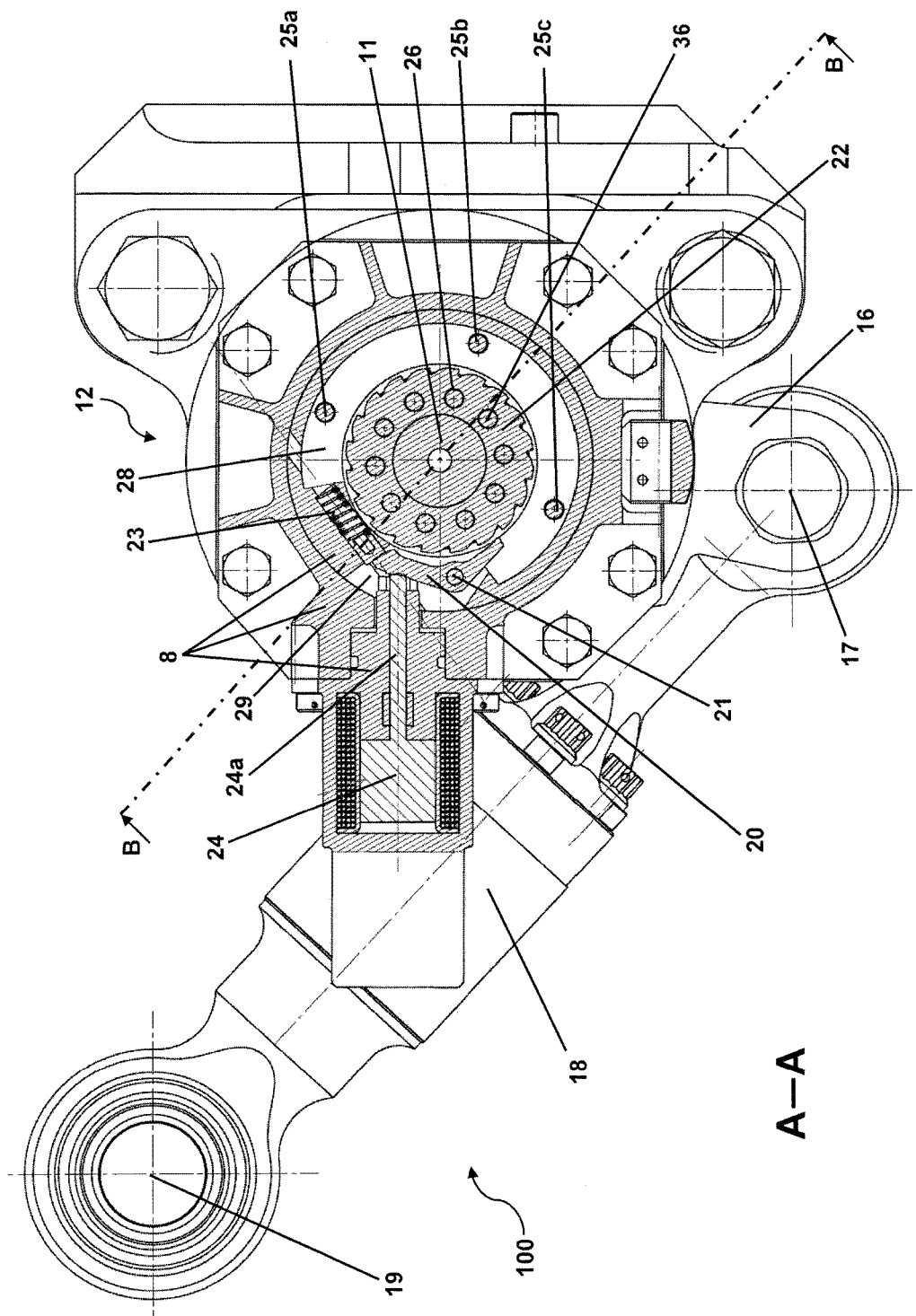
FIG. 3 shows a first cross-sectional view through part of the rotary actuator of FIGS. 1 and 2.

FIG. 3 shows cross-section A-A of FIG. 1, through the anti-extension module 12. The cross-section shows an output shaft 11 of the actuator 100 surrounded by a ratchet wheel 22, which is operatively connected thereto. The ratchet wheel 22 comprises holes 26 and ball bearings 36 located therein, which will be explained in more detail below, in relation to FIG. 4. The ratchet wheel 22 is disposed in a ratchet wheel housing 28, which is secured within actuator housing 8 using fasteners 25a, 25b, 25c.

A pawl 20 is disposed adjacent to the ratchet wheel 22 between the wheel 22 and the actuator housing 8, in a gap 29 in ratchet wheel housing 28. The pawl 20 is pivotally mounted within the actuator 100 via a pin 21. The pawl 20 is in operable communication with an electrical locking (linear) actuator 24 and a pawl spring 23. The locking actuator 24 comprises a solenoid and a push-rod 24a disposed between the pawl 20 and actuator housing 8. The pawl spring 23 is also disposed within actuator housing 8 in gap 29, between the pawl 20 and the ratchet wheel housing 28.

As shown in FIG. 3, the pawl spring 23 biases the pawl 20 about its pivot point at pin 21 in an anti-clockwise direction such that it is forced into engagement with ratchet wheel 22. When the pawl 20 is engaged with the ratchet wheel 22, rotation of the wheel 22 in a clockwise direction is prohibited. When the electrical actuator 24 is activated, push-rod 24a pushes the pawl 20 about its pivot point in a clockwise direction, overcoming the bias of spring pawl 23, such that the pawl 20 disengages from the ratchet wheel 22. When the pawl 20 is disengaged from the ratchet wheel 22, the wheel 22 is free to rotate in either rotational direction. In this way, the ratchet wheel 22 and pawl 20 act as a locking mechanism, to selectively lock rotation of the ratchet wheel 22 in one rotational direction.

Although a pawl 20 and ratchet 22 locking mechanism is used within this embodiment, any suitable locking mechanism, as would be understood by one skilled in the art, may be used.

In this embodiment, the locking actuator 24 comprises a solenoid, however, any other suitable electrical actuator, as would be understood by one skilled in the art, may be used.

In this embodiment, the locking actuator 24 is activated to disengage the locking mechanism, and deactivated to engage it. It should be understood, however, that the opposite mode of operation could be used within the scope of this disclosure.

Figure 4:
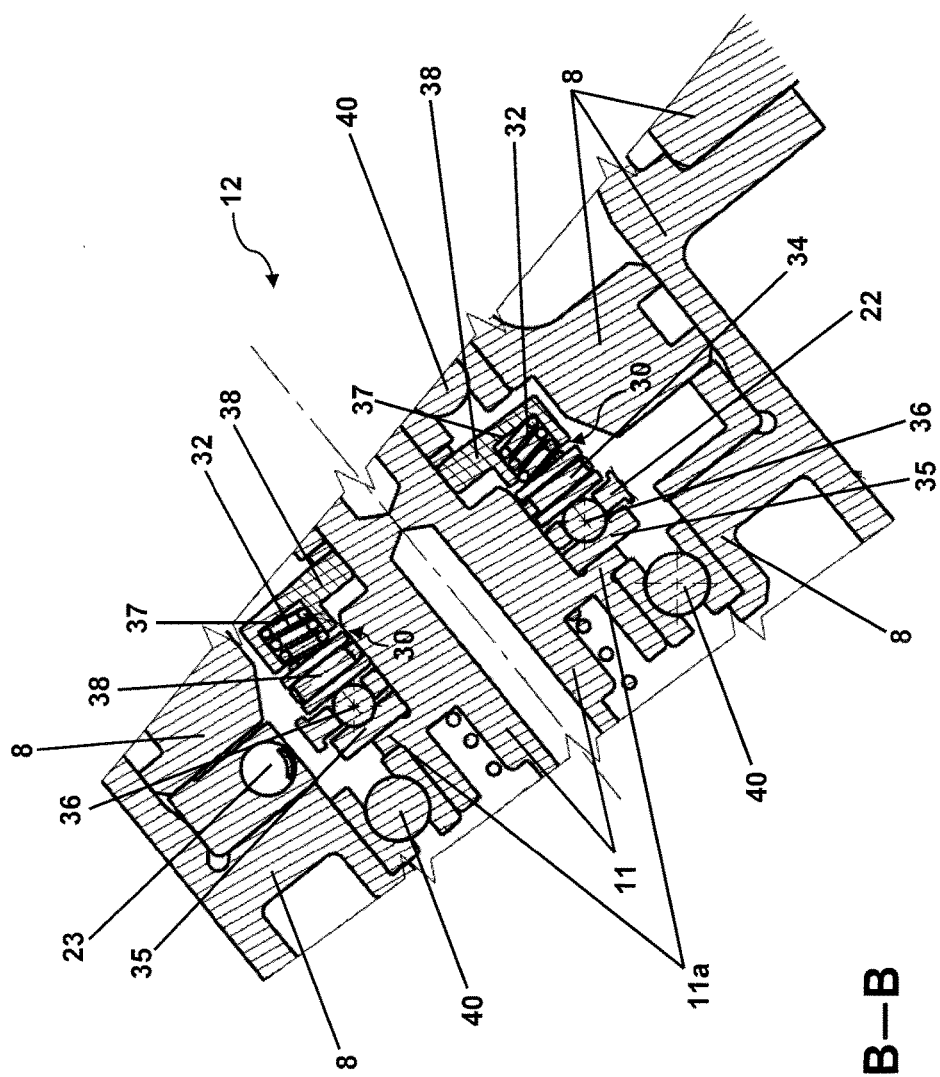
FIG. 4 shows a second cross-sectional view through a part of the rotary actuator of FIGS. 1 to 3.

FIG. 4 shows cross-section B-B of FIG. 2, which shows ratchet wheel 22 operatively connected to a torque limiter 30. The torque limiter 30 comprises a plate 38 having a plurality of recesses 37. The plate 38 is operatively connected to the output shaft 11. A plurality of springs 32 are held in the recesses 37 on the plate 38. Each spring 32 is biased to push against a respective thrust bearing 34. The thrust bearings 34 are in turn biased into contact with respective ball bearings 36.

The effective bias on the ball bearings 36 retains them in a ring 35 containing a plurality of cup washers. The ring 35 is located adjacent to the ratchet wheel 22 and is operatively connected to the output shaft 11 via flange 11a. The engagement of the ball bearings 36 and the cup washer ring 35 allows the ratchet wheel 22 and torque limiter 30 to rotate with the output shaft 11. The operation of the torque limiter 30 will be described in more detail below. Larger, secondary bearings 40 are also provided to secure the output shaft 11 and associated components to the actuator housing 8, and to allow rotation of the shaft 11 and its associated components within the housing 8.

The actuator 100 of the present disclosure features two modes of operation: an operating mode and an anti-extension mode.

In operating mode, actuation of a flight control surface is desired. The locking actuator 24 is activated (i.e. power is supplied to the solenoid), causing push-rod 24a to push on pawl 20, such that the biasing force of pawl spring 23 is overcome (as described above in relation to FIG. 3). This allows free rotation of the ratchet wheel 22 and, through engagement with torque limiter 30, the output shaft 11. The motor module 10 is simultaneously activated to turn output shaft 11, which in turn drives the connecting rod 18 via the anti-extension module 12 and gearbox 14 to extend or retract a flight control surface, for example, to move a spoiler upwardly or downwardly on an aircraft wing.

In anti-extension mode, the extension of a flight control surface is undesirable and is to be prohibited. This can be, for example, when a flight control surface is in a stowed position and it is undesirable for it to be actuated, or a flight control surface has been actuated to a desired position, and any further actuation is undesirable. Such undesirable actuation can be caused by an external force e.g. low pressure over a wing surface. In this mode, the locking actuator 24 is deactivated (i.e. no power is supplied to the solenoid 24). This allows the push-rod 24a to retract and allows the pawl spring 23 to push pawl 20 into engagement with ratchet wheel 22, which prohibits its rotation in a clockwise direction. As ratchet wheel 22 is connected to output shaft 11 via engagement with cup washers 35, this also prohibits rotation of the output shaft 11 in the clockwise direction, which prevents the connecting rod 18 and thus, any flight control surface attached thereto, from being extended.

In this configuration it is important to point out that the ratchet wheel 22 only prohibits rotation in an extension direction of the flight control surface, and not in the reverse direction. Therefore, in an anti-extension mode the flight control surface is still permitted to be retracted (using the actuator 100) to a lower or stowed position, as anti-clockwise rotation of the ratchet wheel 22 will merely cause pawl 20 to skip along the teeth of the ratchet wheel 22. In this embodiment, anti-clockwise rotation of the output shaft 11 and ratchet wheel 22 cause retraction and clockwise rotation causes actuation of the connecting rod 18. It should be understood that within the scope of this disclosure, either rotation direction could be used for actuation or retraction. The output shaft 11 and ratchet wheel 22 could even be configured to counter rotate, if desired.

In either mode, the torque limiter 30 is configured to engage the ratchet wheel 22 (as described in relation to FIG. 4) with cup washer ring 35, such that the wheel 22 and limiter 30 are rotatable with the output shaft 11 (and able to block rotation of the shaft 11 when desired).

In anti-extension mode, the torque limiter 30 serves to disconnect the ratchet wheel 22 from the output shaft 11, should the ratchet wheel 22 experience a torque force, in the direction of rotation that is opposed by the pawl 20 (i.e. clockwise in this embodiment), that is above a predetermined limit $T_{limit}$. Such a force may occur due to the output shaft 11 being urged in that direction by an external load trying to lift (or deploy) the flight control surface. Such a load may damage the locking mechanism or other actuator/flight control surface components if the ratchet wheel 22 remained locked in place.

When a torque greater than $T_{limit}$ is experienced, the tendency for the output shaft 11 to rotate against the locked ratchet wheel 22 is great enough to cause the springs 32 to be compressed such that ball bearings 36 slide out of engagement with the cup washer ring 35. This disengages the ratchet wheel 22 from the output shaft 11. This prevents the locking mechanism and/or other actuator/structural components from being damaged by torque above $T_{limit}$. The torque $T_{limit}$ at which the output shaft 11 disengages ratchet wheel 22 can be tuned, as known in the art, for example, using smaller or larger spring bias from springs 32.

In this embodiment, the torque limiter 30 described above will be readily recognised to those skilled in the art as a ball detent torque limiter. It should, however, be understood that any other suitable torque limiters may be used within the scope of this disclosure, for example, a shear pin torque limiter, a synchronous magnetic torque limiter, or a friction disk and spring torque limiter.

Although the figures and the accompanying description describe a particular embodiment, it is to be understood that the scope of this disclosure is not to be limited to such an embodiment, and is, instead, to be determined by the following claims.

The invention claimed is:

1. A rotary actuator for controlling a flight control surface, the actuator comprising:
    a rotary output shaft for driving a flight control surface;
    a locking mechanism for selectively preventing rotation of the rotary output shaft; and
    a torque limiter for allowing the locking mechanism to be bypassed upon the locking mechanism experiencing a torque above a predetermined limit, wherein the torque limiter comprises a ball detent torque limiter;
    wherein the locking mechanism is configured, when in a first operating state, to allow rotation of the output shaft in both first and second rotational directions, and, when in a second operating state, to prevent rotation of the output shaft in the first rotational direction and to allow rotation of the output shaft in the second rotational direction;
    wherein the locking mechanism comprises a locking actuator for switching the locking mechanism between the first and second operating states and optionally, the locking mechanism is configured such that upon deactivation of the locking actuator, the locking mechanism is switched from the first operating state to the second operating state;
    wherein the locking mechanism further comprises:
    a ratchet wheel operatively connected to the output shaft and rotatable therewith; and
    a pawl operatively connected to the locking actuator and being operable between a first position in the first operating state to a second position in the second operating state, the pawl being out of contact with the ratchet wheel in its first position to allow rotation of the output shaft in the first rotational direction and in contact with the ratchet wheel in the second position of the pawl to prohibit rotation of the output shaft in the first rotational direction; and
    wherein the ball detent torque limiter comprises a plurality of ball bearings located in holes in the ratchet wheel and a respective ball biasing member associated with each ball bearing.

2. The rotary actuator of claim 1, wherein the locking mechanism further comprises a pawl biasing member arranged to bias the pawl into the second position of the pawl.

3. The rotary actuator of claim 2, wherein the pawl biasing member is a pawl spring.

4. The rotary actuator of claim 2, wherein, the locking actuator is configured to switch the locking mechanism into its first operating state by overcoming the bias force of the pawl biasing member and moving the pawl into the first position of the pawl.

5. The rotary actuator of claim 1, wherein, upon the locking mechanism experiencing a torque above the predetermined limit in the second operating state of the locking mechanism, the torque limiter allows the output shaft to rotate relative to the ratchet wheel.

6. The rotary actuator of claim 1, wherein the locking actuator comprises a linear actuator, optionally comprising a solenoid and a push-rod.

7. The rotary actuator of claim 1, wherein each ball biasing member comprises a spring.

8. A flight control surface actuation assembly comprising:
    an actuator as claimed in claim 1; and
    a flight control surface being operatively connected to the rotary output shaft.

9. The assembly of claim 8, wherein rotating the rotary output shaft in a or the first direction causes the flight control surface to be extended into a deployed position and rotating the rotary output shaft in a or the second direction causes the flight control surface to be moved into a stowed position.

10. The assembly of claim 8, wherein the flight control surface is a spoiler.

* * * * *